United States Patent [19]

Huff

[11] Patent Number: 5,396,645
[45] Date of Patent: Mar. 7, 1995

[54] SYSTEM AND METHOD FOR DETERMINING WHETHER TO ASSIGN A MACROCELL OR MICROCELL COMMUNICATION FREQUENCY TO A MOBILE COMMUNICATION TERMINAL

[75] Inventor: Duane L. Huff, Annandale, N.J.

[73] Assignee: Comcast Pcs Communications, Inc., Philadelphia, Pa.

[21] Appl. No.: 865,602

[22] Filed: Apr. 9, 1992

[51] Int. Cl.$^6$ .............................. H04B 7/08; H04Q 7/00
[52] U.S. Cl. ................................. 455/33.4; 455/33.3; 455/34.1; 455/134
[58] Field of Search ............... 455/33.1, 33.3, 33.4, 455/34.1, 132, 133, 134, 135, 277.1–277.2, 278.1

[56] References Cited

U.S. PATENT DOCUMENTS

| | | | |
|---|---|---|---|
| 4,403,343 | 9/1983 | Hamada | 455/134 |
| 4,450,585 | 5/1984 | Bell | 455/135 |
| 4,696,058 | 9/1987 | Tachita et al. | 455/277 |
| 4,704,734 | 11/1987 | Menich et al. | 455/33 |
| 4,710,945 | 12/1987 | Bocci et al. | 375/100 |
| 4,742,563 | 5/1988 | Fukumura | 455/132 |
| 4,742,568 | 5/1988 | Furuya | 455/277 |
| 4,756,023 | 7/1988 | Kojima | 455/134 |
| 4,765,753 | 8/1988 | Schmidt | 379/60 |
| 4,876,743 | 10/1989 | Lindenmeier et al. | 455/133 |
| 5,140,695 | 8/1992 | Yasuda et al. | 455/34.1 |

FOREIGN PATENT DOCUMENTS 196772  8/1991  Japan ............................... 455/33.4

Primary Examiner—Edward F. Urban
Assistant Examiner—Thanh C. Le
Attorney, Agent, or Firm—Panitch Schwarze Jocobs & Nadel

[57] ABSTRACT

A system and method are provided for determining whether to assign a macrocell communication frequency or a microcell communication frequency to a particular mobile communication terminal for a particular communication interval of a communication session. The speed of the mobile communication terminal is estimated immediately prior to the communication interval based upon the number of changes in the strength of signals received from the mobile communication terminal during a predetermined time interval. If the estimated speed is within a first predetermined range, one of the macrocell communication frequencies is assigned to the mobile communication terminal. If the estimated speed is within a second predetermined range, one of the microcell communication frequencies is assigned to the mobile communication terminal.

11 Claims, 5 Drawing Sheets

SYSTEM AND METHOD FOR DETERMINING WHETHER TO ASSIGN A MACROCELL OR MICROCELL COMMUNICATION FREQUENCY TO A MOBILE COMMUNICATION TERMINAL

BACKGROUND OF THE INVENTION

The present invention generally relates to mobile telecommunications systems, and more particularly to a system and method for determining whether to assign a macrocell communication frequency or a microcell communication frequency to a particular mobile communication terminal for a particular communication interval of a communication session.

Radiophone communication using mobile communication terminals in mobile telecommunication systems has become very popular. Generally, such mobile communication terminals include hand-held, personal communication terminals and vehicle mounted communication terminals (e.g., car phones). As a result of the increased popularity of radiophone communication, some geographic areas, particularly city areas, are becoming overloaded with requests for additional radiophone communication frequencies. However, the number of available radiophone communication frequencies is limited because the Federal Communication Commission (FCC) licenses only a finite number of radiophone communication frequencies for each geographic area. Thus, topologies for mobile telecommunication systems which maximize the use of a finite number of radiophone communication frequencies have been developed.

FIG. 1 illustrates a conventional topology for use with mobile telecommunication systems. The topology includes a relatively large geographic area called a macrocell area (typically from 30 to 200 square miles in area). The macrocell area is divided into a number of smaller geographical areas called microcell areas (each typically from 0.1 to 3 square miles in area). In the topology of FIG. 1, the macrocell area includes nine microcell areas.

Assigned to the macrocell area are a number of unique macrocell communication frequencies which are usable throughout the macrocell area. That is, only a single mobile communication terminal operating within the macrocell area may be assigned to any particular macrocell communication frequency. The communication frequencies assigned to a macrocell generally are not utilized in an adjoining macrocell in order to reduce interference problems.

Associated with the microcell areas are a number of microcell communication frequencies. Certain microcell areas share the same microcell communication frequencies. That is, multiple mobile communication terminals may be assigned to the same microcell communication frequency as long as all of the mobile communication terminals are located in different microcell areas which are geographically separated. In the case of the macrocell shown in FIG. 1 the same microcell communication frequencies could be used in microcells 1, 3 and 5. Because of geographic separation and with the use of the low power levels employed with most hand held mobile communication terminals, no interference would occur if the same communication frequencies are used in microcells 1, 3 and 5 thereby enabling more mobile communications terminals to be used within a particular macrocell without the need to preempt additional frequencies.

When a radiophone communication request from a mobile communication terminal is received by a mobile telecommunication system, the mobile telecommunication system must determine whether to assign to the particular mobile communication terminal a macrocell communication frequency or a microcell communication frequency. One manner in which conventional mobile telecommunication systems perform such an assignment is as follows. If the telecommunication system determines (based on information contained in the request from the mobile communication terminal) that the mobile communication terminal is a hand-held personal terminal, then the mobile telecommunication system assigns a microcell communication frequency to the mobile communication terminal. If, however, the mobile telecommunication system determines that the mobile communication terminal is a vehicle mounted communication terminal, then the mobile telecommunication system assigns a macrocell communication frequency to the mobile communication terminal.

One assignment procedure used by conventional mobile communication systems is based on the following assumptions. First, moving vehicle mounted communication terminals are likely to traverse multiple microcells during a particular communication session. If a microcell frequency were assigned to a vehicle mounted communication terminal, it is likely that multiple microcell frequencies would have to be used and multiple transfers or "handoffs" would be required as the vehicle moves though the microcells, tying up multiple frequencies and transfer resources for a single communication session. Therefore, a macrocell communication frequency which operates throughout the macrocell area is appropriate. Second, personal terminals are likely to travel only within a microcell area, if at all, during a particular communication session. Therefore, a microcell communication frequency having limited operational range is appropriate for a personal communication terminal.

This conventional assignment procedure is flawed, however, because personal terminals are often located in vehicles which traverse multiple microcells during a particular communication session. As a personal terminal in a vehicle travels from one microcell to another, the mobile telecommunication system must switch or handoff the personal terminal from one microcell to another, a process which is inherently inefficient and wasteful of communication resources.

Similarly, a vehicle-mounted terminal may spend long periods of conversation time within a microcell area because it is parked, or delayed by traffic conditions. It is inefficient and wasteful to utilize a macrocell communication frequency under such conditions.

Multiple handoffs place a great strain on switching and control resources in mobile telecommunication systems. In fact, multiple handoffs may impede the reliable performance of small microcell systems. That is, customers who select a microcell based service may experience dropped calls (that is, disconnections) when they attempt to use their personal terminals in moving vehicles if the handoff procedures are not properly executed.

Therefore, an improved system and method for determining whether to assign a macrocell communication frequency or a microcell communication frequency to a mobile communication terminal is required, particularly a personal communication terminal which is being used in a moving vehicle, or a vehicle-mounted terminal which is being used in a stationary vehicle such that switching and control resources and communications frequencies in mobile telecommunication systems are conserved.

SUMMARY OF THE INVENTION

Briefly stated, the present invention is directed to a system and method for determining whether to assign a macrocell communication frequency or a microcell communication frequency to a particular mobile communication terminal for a particular communication interval of a communication session. The present invention is intended to operate in a communication system having a macrocell area which includes multiple microcell areas. The macrocell area has one or more unique macrocell communication frequencies and the microcell areas share a plurality of microcell communication frequencies.

In practicing the method of the present invention the speed of the mobile communication terminal is estimated immediately prior to the communication interval. If the estimated speed is within a first predetermined range, one of the macrocell communication frequencies is assigned to the mobile communication terminal. If the estimated speed is within a second predetermined range, one of the microcell communication frequencies is assigned to the mobile communication terminal.

In making the speed estimate in a preferred embodiment, radio signals transmitted by the mobile communication terminal are received at two or more receivers. The received radio signal having the greatest signal strength is identified and a selection network is switched to the receiver which received the identified radio signal if the selection network is not already switched to this receiver. A count is incremented whenever the selection network switches from one of the receivers to another of the receivers over a predetermined time interval. After expiration of the predetermined time interval, the speed of the mobile communication terminal is estimated based on the count.

BRIEF DESCRIPTION OF THE DRAWINGS

The foregoing summary of the present invention, as well as the following detailed description of preferred embodiments, will be better understood when read in conjunction with the appended drawings. For the purpose of illustrating the invention, there is shown in the drawings embodiments which are presently preferred, it being understood, however, that the invention is not limited to the specific arrangements and instrumentalities disclosed. In the drawings.

DETAILED DESCRIPTION OF THE PREFERRED EMBODIMENTS

1. Diversity Reception Radio Systems

This section generally describes the structure and operation of diversity reception radio systems, which form a part of the present invention.

Conventionally, radiophone reception in mobile telecommunication systems is achieved through use of a diversity reception radio system. There are two primary types of diversity reception radio systems: selection diversity reception radio systems and combining diversity reception radio systems.

Figure 1:
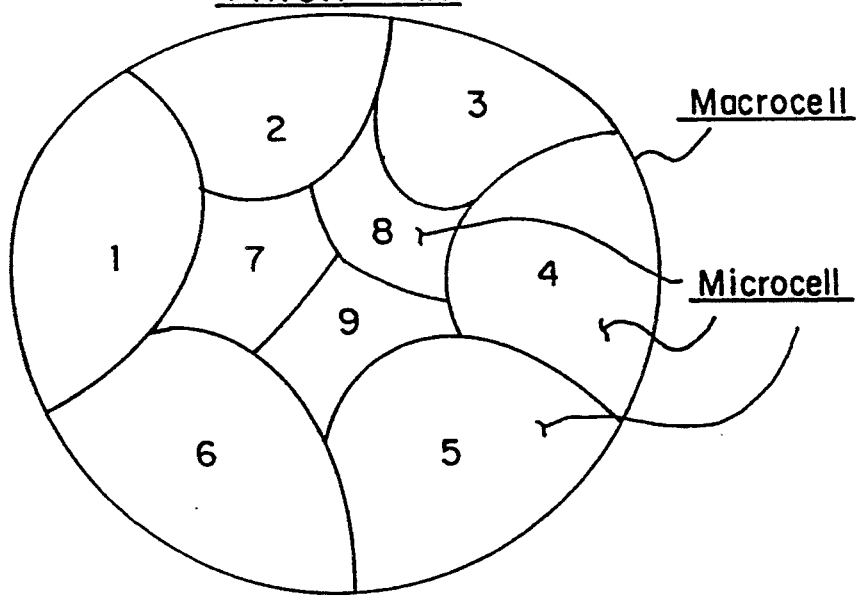
FIG. 1 is a conventional topology for use with mobile telecommunication systems.
Figure 2:
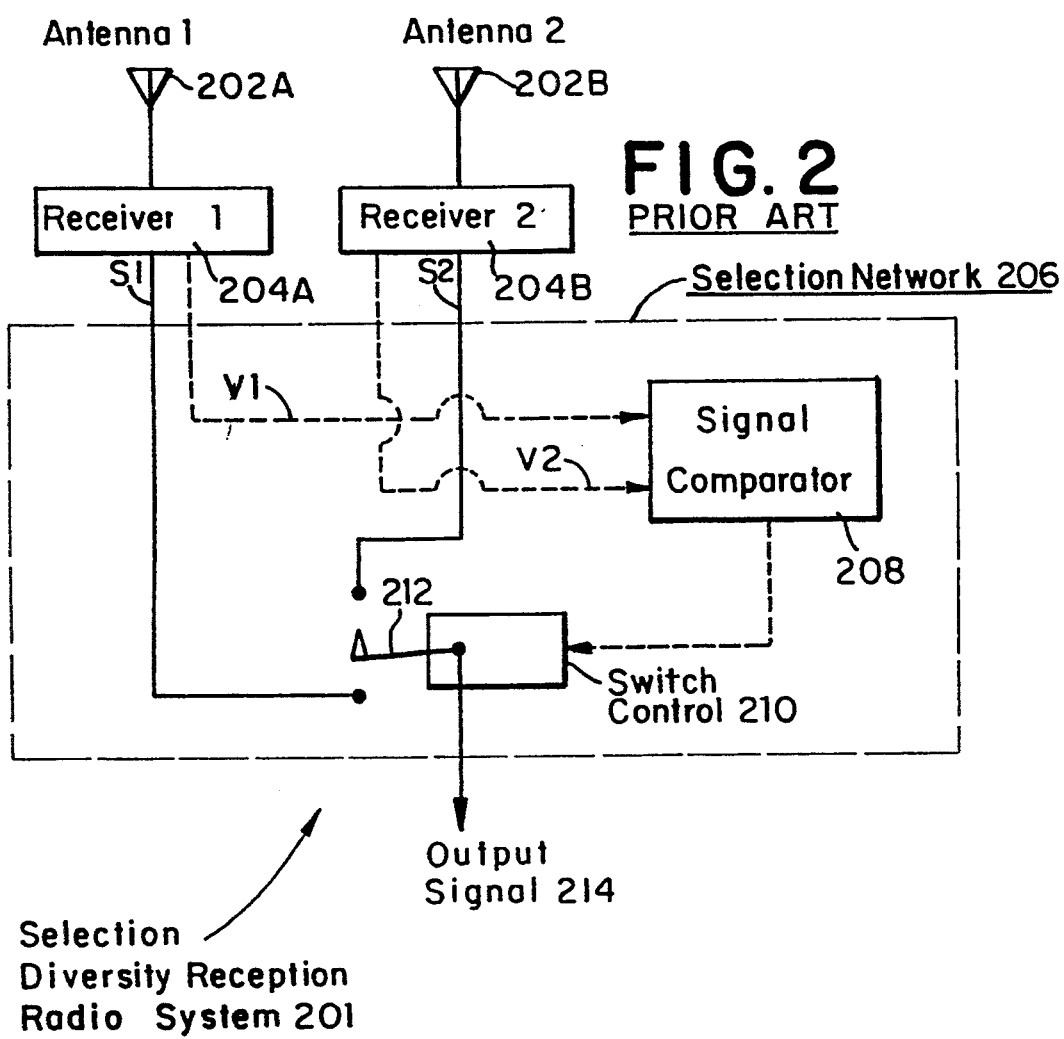
FIG. 2 is a functional schematic block diagram of a conventional selection diversity reception radio system.

Referring to the drawings in which like numerals are used for identical elements throughout, there is shown in FIG. 2 a functional block diagram of a conventional selection diversity reception radio system 201 wherein two or more preferably physically separated antennas 202A and 202B receive radio waves from a mobile communication terminal (not shown) of a type well known in the art (such as cellular, SMR, private radio, land mobile, etc.) and generally commercially available from a variety of sources. The antennas 202A and 202B may be any widely available base station antennas such as Celwave model PD1132 or Decibel Products Model DB-833. Two or more receivers 204A and 204B, each connected to one of the antennas 202A and 202B, generate baseband signals S1 and S2 from the received radio waves. The receivers 204A and 204B may be any widely commercially available base station receivers such as Model SLF 2750A from Motorola (selection diversity), Model J41654CA-124 from AT&T (selection diversity), or Model B5KBTE101101-13 from Ericsson (combining diversity). The receivers 204A and 204B also generate strength signals V1 and V2 from the received radio waves. The signals V1 and V2 are generated by waveform detecting the received radio waves. The detected signals V1 and V2 represent the respective signal strengths of the received radio waves.

The relative signal strength of the radio waves received at the antennas 202A and 202B depend upon many factors including, but not limited to, the horizontal and vertical separation of the antennas 202A and 202B, the height of the antennas 202A and 202B above the surrounding terrain and structures, the environment within which the mobile communication terminal is operated, the distance from the antennas 202A and 202B to the mobile communication terminal, etc. Since the signal strength is dependent upon so many variables, the relationship between the signal strength of the received radio waves at a particular antenna 202A and 202B and the distance between the antenna 202A and 202B and the mobile communication terminal is not simply a linear function but is more like the graph shown in FIG. 3. Therefore, depending upon the location of a particular mobile communication terminal, the instantaneous signal strength at one antenna 202A or 202B is generally greater than the instantaneous signal strength at another antenna 202A or 202B.

Referring again to FIG. 2, a selection network 206 receives the baseband signals S1 and S2 and the detected strength signals V1 and V2. The selection network 206 includes a signal comparator 208, a switch controller 210, and a switch 212. The signal comparator 208 compares the detected strength signals, signals V1 and V2, and determines which of the received radio waves (or correspondingly, which of the baseband signals S1 or S2) has the greatest signal strength. The switch control 210, in response to a signal from the signal comparator 208, switches the switch 212 to the receiver 204A or 204B associated with the baseband signal S1 or S2 having the greatest signal strength, thereby generating an output signal 214 which is used in the telecommunications system to provide the best quality communications.

Figure 4:
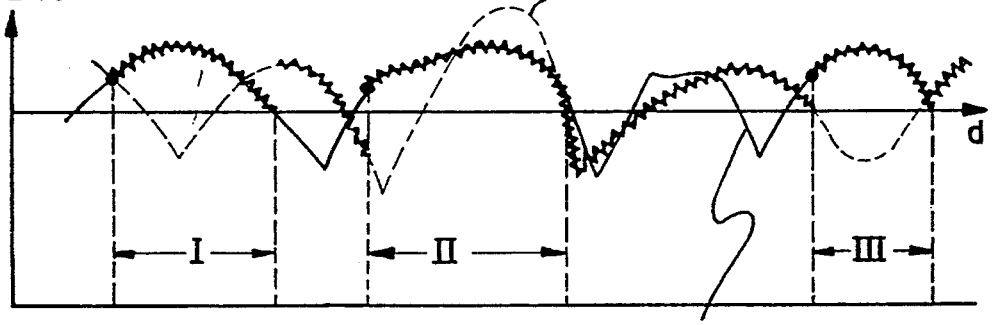

An example of the operation of the selection diversity reception radio system 201 is shown in FIG. 4. FIG. 4 illustrates an example of the relative signal strengths at the output of an antenna subsystem 1 (containing antenna 202A and receiver 204A) and an antenna subsystem 2 (containing antenna 202B and receiver 204B). The jagged line which is superimposed over the waveforms in FIG. 4 indicates when the switch 212 is switched to receiver 204A or receiver 204B. This is also indicated by Sections I, II and III in FIG. 4, which generally indicate when the signal strength of antenna subsystem 2 is greater than the signal strength of antenna subsystem 1. Correspondingly, Sections I, II and III in FIG. 4 indicate when the switch 212 is switched to receiver 204B. Similarly, those areas of the graph outside of Sections I, II and III indicate when the signal strength of antenna subsystem 1 is generally greater than the signal strength of antenna subsystem 2 and when switch 212 is correspondingly switched to receiver 204A.

In selecting the received radio signal having the greatest signal strength, many conventional selection networks 206 use well known algorithms which employ fixed levels of hysteresis to avoid unnecessary switching between signals where either one of the signals is acceptable. Many conventional selection networks 206 also use other well known algorithms which automatically adjust the level of hysteresis employed to avoid unnecessary switching at high signal levels, or at low signal levels where none of the received radio signals are satisfactory, and where such switching would only degrade the quality of the resulting output signal 214 due to the added impairments of the switching function itself. It is due to the use of such well-known algorithms that the jagged line in FIG. 4 does not precisely track the greater of the two signals.

As noted above, combining the radio signals is another type of diversity reception radio system. As is well known, the structure and operation of such combining radio systems are similar to that of the above described selection diversity reception radio system. However, in combining radio systems, the selection network 206 is replaced by circuitry for combining (rather than choosing between) baseband signals S1 and S2.

2. Macrocell/Microcell Frequency Selection System and Method

Figure 3:
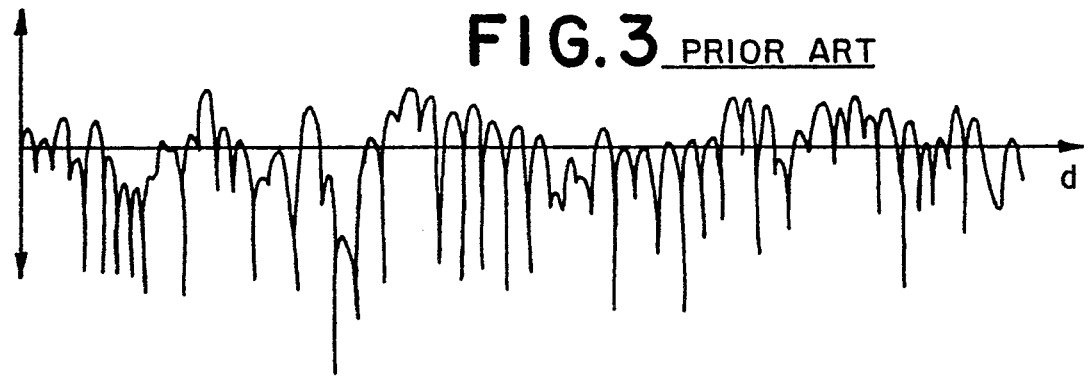
FIGS. 3 and 4 present graphs which illustrate the operation of conventional selection diversity reception radio systems.

The present invention is directed to a system and method for determining whether to assign a macrocell communication frequency or a microcell communication frequency to a particular mobile communication terminal for a particular communication interval of a communication session. As noted above, in a moving, multipath environment such as a mobile telecommunication system, radio signals which are transmitted by a mobile communication terminal and which are received by one or more antenna subsystems (each containing an antenna and a receiver) are characterized by rapid and deep fades as either the mobile communication terminal or the antenna subsystems move through the environment. The fades, which are represented by the negative-going peaks in FIG. 3, are the result of the addition and cancellation of the radio waves arriving from multiple paths and scatterers. The more rapid the movement, the more often a fade caused by multipath interference is experienced. Adequately spaced or differently polarized antennas operate to decorrelate the received radio waves such that fades do not occur at the same time in the receivers attached to the antennas.

Given this characteristic of mobile telecommunication systems, the present invention operates generally as follows. In order to determine whether to assign a macrocell communication frequency or a microcell communication frequency to a mobile communication terminal, the present invention detects and counts the number of fades experienced in radio signals transmitted by the mobile communication terminal during a predetermined time duration. The fade count is used to estimate the speed of the mobile communication terminal not necessary in absolute terms (i.e., miles per hour) but in terms which are directly related to absolute terms. Generally, the fade count associated with a rapidly moving mobile communication terminal is significantly greater than the fade count associated with a slow-moving or stationary mobile communication terminal. Therefore, if the fade count for a particular time period is relatively high, the present system estimates that the speed of the mobile communication terminal is also relatively high. If the fade count for a particular time period is low, the present system estimates that the speed of the mobile communication terminal is also relatively low.

The present invention then uses the speed estimate to determine whether to assign a macrocell communication frequency or a microcell communication frequency to the particular mobile communication terminal for the ensuing communication interval. Generally, a rapidly moving mobile communication terminal often traverses through multiple microcells during a communication interval or session. In contrast, a slow-moving or stationary mobile communication terminal usually remains within the range of a single microcell during an entire communication interval or session. Therefore, the present invention determines that a macrocell communication frequency should be assigned if the mobile communication terminal is moving at a high speed and that a microcell communication frequency should be assigned if the mobile communication terminal is moving at a low speed. The difference between "high speed" and "low speed" may vary for each communication system due to the size of the microcells and other factors and may be individually selected for each communication system.

Knowledgeable frequency assignment by the present system results in fewer handoffs of a moving mobile communication terminal and more efficient utilization of the available communication frequencies. By reducing the number of handoffs, the present system conserves valuable switching and control resources in the mobile telecommunication system which results in a more effective communication system.

The structure and operation of specific embodiments of the present invention shall now be described.

Figure 5:
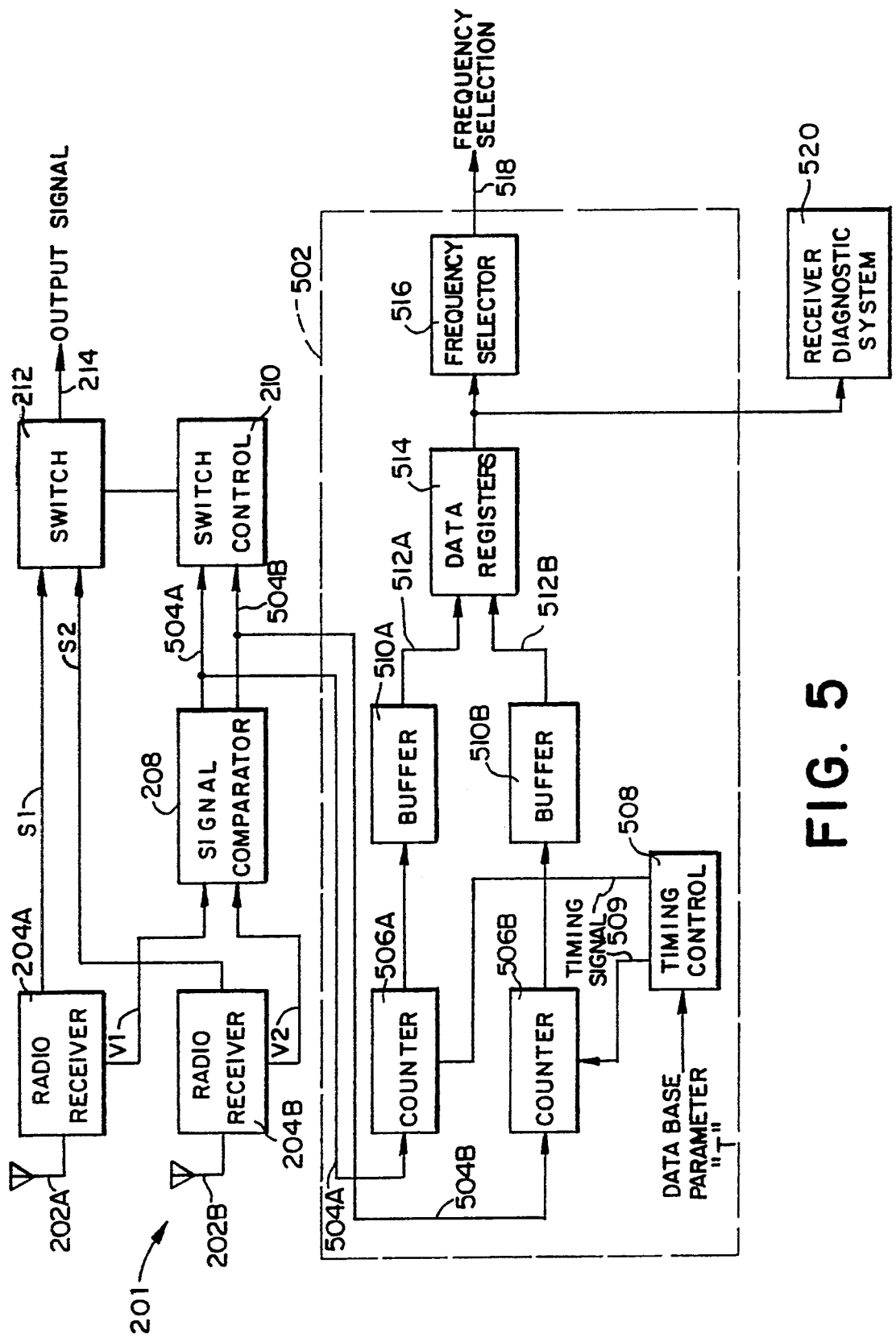
FIG. 5 is a block diagram of a macrocell/microcell frequency assignment system according to a first embodiment of the present invention.

FIG. 5 is a functional block diagram of a first embodiment of the present invention. Specifically, FIG. 5 illustrates a selection diversity reception radio system 201 connected to a macrocell/microcell frequency selection system 502. According to the present embodiment, the selection diversity reception radio system 201 generally operates to detect fades in radio signals transmitted by a mobile communication terminal. The macrocell/microcell frequency selection system 502 generally operates to count the fades, estimate a speed of the mobile communication terminal based on the fade count, and determine whether to assign a macrocell or microcell communication frequency to the particular mobile communication terminal based on the speed estimate.

The selection diversity reception radio system 201 includes two adequately spaced or differently polarized antennas 202A and 202B, two receivers 204A and 204B, comparing means such as a signal comparator 208, control means such as a switch control 210, and a selection network such as a switch 212. The structure and operation of these components are generally described above.

In particular, the antennas 202A and 202B receive radio signals transmitted by a mobile communication terminal. The receivers 204A and 204B generate baseband signals S1 and S2 from the received radio signals. The receivers 204A and 204B also generate detected strength signals V1 and V2 from the received radio signals. The detected strength signals V1 and V2 represent the instantaneous signal strengths of the baseband signals S1 and S2, respectively.

The signal comparator 208 receives and compares the detected strength signals V1 and V2. If detected strength signal V1 is greater than detected strength signal V2, then the signal comparator 208 sends a selection signal on a line 504A. If, instead, the detected strength signal V2 is greater than the detected strength signal V1, then the signal comparator 208 sends a selection signal on a line 504B.

The selection signals 504A and 504B essentially represent fade indicators. That is, the signal comparator 208 generates the selection signals 504A or 504B when the received radio waves at one of the antennas 202A or 202B has faded with respect to the received radio waves at the other antenna 202A or 202B.

The selection signals 504A and 504B cause the switch 212, via the switch control 210, to switch to whichever of radio receiver 204A or 204B is receiving the strongest radio signals (i.e., having the strongest signal strength level V1 or V2) for use as the output signal 214 to the remainder of the communication system.

As noted above, the selection diversity reception radio system 201 is connected to a macrocell/microcell frequency selection system 502. The selection system 502 includes a pair of counters 506A and 506B which also receive the selection signals 504A and 504B, respectively, the selection signals 504A and 504B being means for incrementing the counters 506A and 506B. Preferably, the counters 506A and 506B are implemented using well known hardware components.

The selection signals 504A and 504B activate the respective counters 506A and 506B. Specifically, a count in counter 506A is incremented when counter 506A receives a selection signal 504A indicating the signal strength at antenna 202A is greater. Similarly, a count in counter 506B is incremented when counter 506B receives a selection signal 504B indicating that the signal strength at antenna 202B is greater. Since the counters 506A and 506B are activated and incremented by the selection signals 504A and 504B, the counters 506A and 506B effectively keep a count of the number of times that each of the receivers 204A and 204B, respectively, is selected by the switch 212. In other words, each of the counters 506A and 506B count the number of fades which are detected by the selection diversity reception radio system 201 for each of the receivers 204A and 204B.

The selection system 502 also includes timing control means such as a timing control 508 which generates a timing signal 509 upon the expiration of a predetermined time period or interval. Preferably, the timing control 508 is implemented using well known hardware components. The length of the predetermined time interval may be varied by a system operator based on a particular system geography or other factors. For example, a system operator may enter a new value "T" for the predetermined time period at a computer terminal which can communicate with the macrocell/microcell frequency selection system 502.

The counters 506A and 506B each continue to keep a fade count until they receive the timing signal 509, which marks the end of the predetermined time period. Upon receiving the timing signal 509 from the timing control 508, the counters 506A and 506B each transfer their respective count totals to a pair of buffers 510A and 510B. At the same time both of the counter 506A and 506B are reset or cleared to begin a new fade count for the next predetermined time period. Preferably, the buffers 510A and 510B are implemented using well known hardware components. The fade counts which are stored in the buffers 510A and 510B each represent, for the predetermined time period just expired, the number of times the selection diversity reception radio system 201 deleted a fade in the received radio waves. For reference purposes, the counts stored in the buffers 510A and 510B are called fade counts 512A and 512B, respectively.

The fade counts 512A and 512B stored in the buffers 510A and 510B are each transferred to and stored in data registers 514. A frequency selector 516 accesses the fade counts 512A and 512B stored in the data registers 514. Preferably, the data registers 512 and the frequency selector 516 are implemented in software. The frequency selector 516 determines whether to assign a macrocell communication frequency or a microcell communication frequency to the mobile communication terminal for the next predetermined time period or interval of the communications session. The frequency selector 516 makes the frequency determination as follows.

The frequency selector 516, acting as a means for estimating speed, uses the fade counts 512A and 512B to estimate the speed of the mobile communication terminal. The selector 516 compares the fade counts 512A and 512B to stored empirically developed values which are indicative of the number of fades expected for a particular speed of a mobile communication terminal. As will be appreciated by those skilled in the art, the stored values will vary greatly for each communication system due to geographic conditions, local terrain conditions, vehicular traffic distributions, and numerous other factors. However, over a relatively short period of time the values can be conveniently determined for each communication system. It will also be appreciated by those skilled in the art that it is not necessary to identify or determine a particular speed of the mobile terminal in traditional units, i.e., miles per hour. All that is required is a determination whether the mobile communication terminal is moving at a speed which is high enough (high number of fades) to justify the assignment of a macrocell frequency or slow enough (low number of fades) to permit the use of a microcell frequency with few or no handoffs. Consequently, if the number of fade counts 512A, 512B is high (relating to the stored values), then the frequency selector 516 estimates that the speed of the mobile communication terminal is high. If the number of fade counts 512A, 512B is low (relating to the stored values), then the frequency selector 516 estimates that the speed of the mobile communication terminal is low.

Preferably, the frequency selector 516 estimates that the speed of the mobile communication terminal is high if the number of fade counts 512 falls within a first predetermined range established by the stored values and system experience. Similarly, the frequency selector 516 estimates that the speed of the mobile communication terminal is low if the number of fade counts 512 falls within a second predetermined range established by the stored values and system experience.

The stored values associated with the first predetermined range and the second predetermined range are implementation dependents as discussed above and are determined using empirical procedures directed to determining the optimal ranges for minimizing the load on the mobile telecommunication system's switching network, given a limited number of macrocell communication frequencies and the completion of multiple handoffs when using microcell frequencies.

In general, either fade count 512A or fade count 512B may be used by the frequency selector 516 to estimate the speed of the mobile communication terminal. In practice, the frequency selector 516 preferably uses the one fade count 512A or 512B having the greatest value. Such selection and use by the frequency selector 516 enables the frequency selector 516 to operate correctly even if one of the receivers 204A or 204B of the associated system fails.

After estimating the speed of the mobile communication terminal relative to the stored values, the frequency selector 516 uses the speed estimate to determine whether to assign a macrocell communication frequency or a microcell communication frequency to the mobile communication terminal for the next time period or communication interval of the communication session. Such assignment is performed as follows. If the speed estimate of the mobile communication terminal is high, then the frequency selector 516 determines that a macrocell communication frequency should be assigned to the mobile communication terminal for the next time period. If the speed estimate of the mobile communication terminal is low, then the frequency selector 516 determines that a microcell communication frequency should be assigned to the mobile communication terminal.

The frequency assignment selection made by the frequency selector 516 is transmitted via a frequency selection signal 518 to a frequency assignment system (not shown in FIG. 5) which is a standard portion of existing mobile communication systems. The frequency assignment system assigns either a macrocell communication frequency or a microcell communication frequency to the mobile communication terminal for the next time period in accordance with the frequency selection signal 518 used alone, or in combination with other information such as the terminal class mark identifying the type of terminal equipment that is transmitting to the servicing communication system at the time the call is established. Thus, the frequency assignment system uses the frequency selection signal 518 as part of the decision process regarding the frequency channel to initially assign a call to, and the frequency channel(s) to switch the call to once the call is established.

The fade counts 512A and 512B may also be used for purposes other than for frequency assignment. For example, a receiver diagnostic system 520 could use the fade counts 512A and 512B to identify potential problems in one of the antenna subsystem, i.e., the antenna 202A and receiver 204A or the antenna 202B and receiver 204B. On average over time, the fade count associated with an antenna subsystem having degraded performance is lower than the fade count associated with an antenna subsystem performing as expected, since a faulty antenna subsystem is not selected by the comparator 208 as often as a properly functioning antenna subsystem because the baseband signals generated by the faulty antenna subsystem ordinarily has a lower signal strength than the baseband signals generated by a properly functioning antenna subsystem. Therefore, the receiver diagnostic system 520 detects a faulty antenna subsystem by monitoring the fade counts 512A and 512B and determining when one of the fade counts 512A and 512B is consistently significantly less than the other of the fade counts 512A and 512B. Antenna subsystems having consistently low fade counts over time are marked as potentially faulty and may be further analyzed and serviced by maintenance personnel.

As described above, the macrocell/microcell frequency selection system 502 of the first embodiment of the present invention is intended to operate with selection diversity reception radio systems which accurately detect fading in radio waves transmitted by mobile communication terminals and switch among two or more receivers to select the strongest signal from a single receiver. However, not all selection diversity reception radio systems accurately detect fading and switch among receivers based upon the single best signal. Some selection diversity reception radio systems suppress unnecessary switching (thereby suppressing fade detection) when encountering strong signals or very weak signals. Additionally, combining diversity reception radio systems do not switch among receivers, but rather combine all of the baseband signals generated by the receivers. Such combining diversity reception radio systems do not detect fades at all.

The above described macrocell/microcell frequency selection system 502 of the first embodiment of the present invention cannot properly operate with such selection and combining diversity reception radio systems since they do not accurately detect fading in radio waves transmitted by mobile communication terminals. Thus, a system and method for determining whether to assign a macrocell or microcell communication frequency to a mobile communication terminal, for use with selection and combining diversity reception radio systems which do not accurately detect fading, is required.

Figure 6:
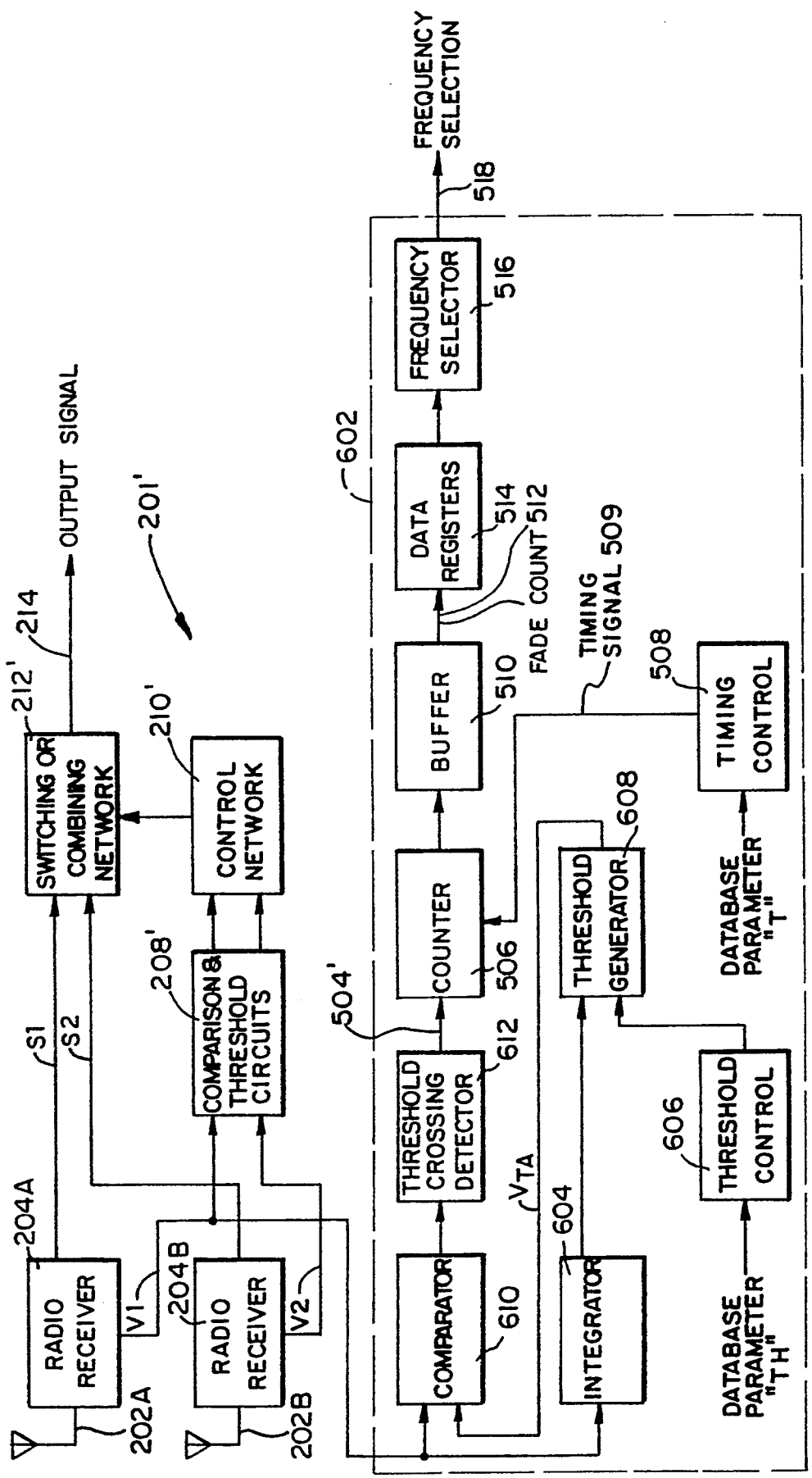
FIG. 6 is a block diagram of a macrocell/microcell frequency assignment system according to a second embodiment of the present invention.
Figure 7:
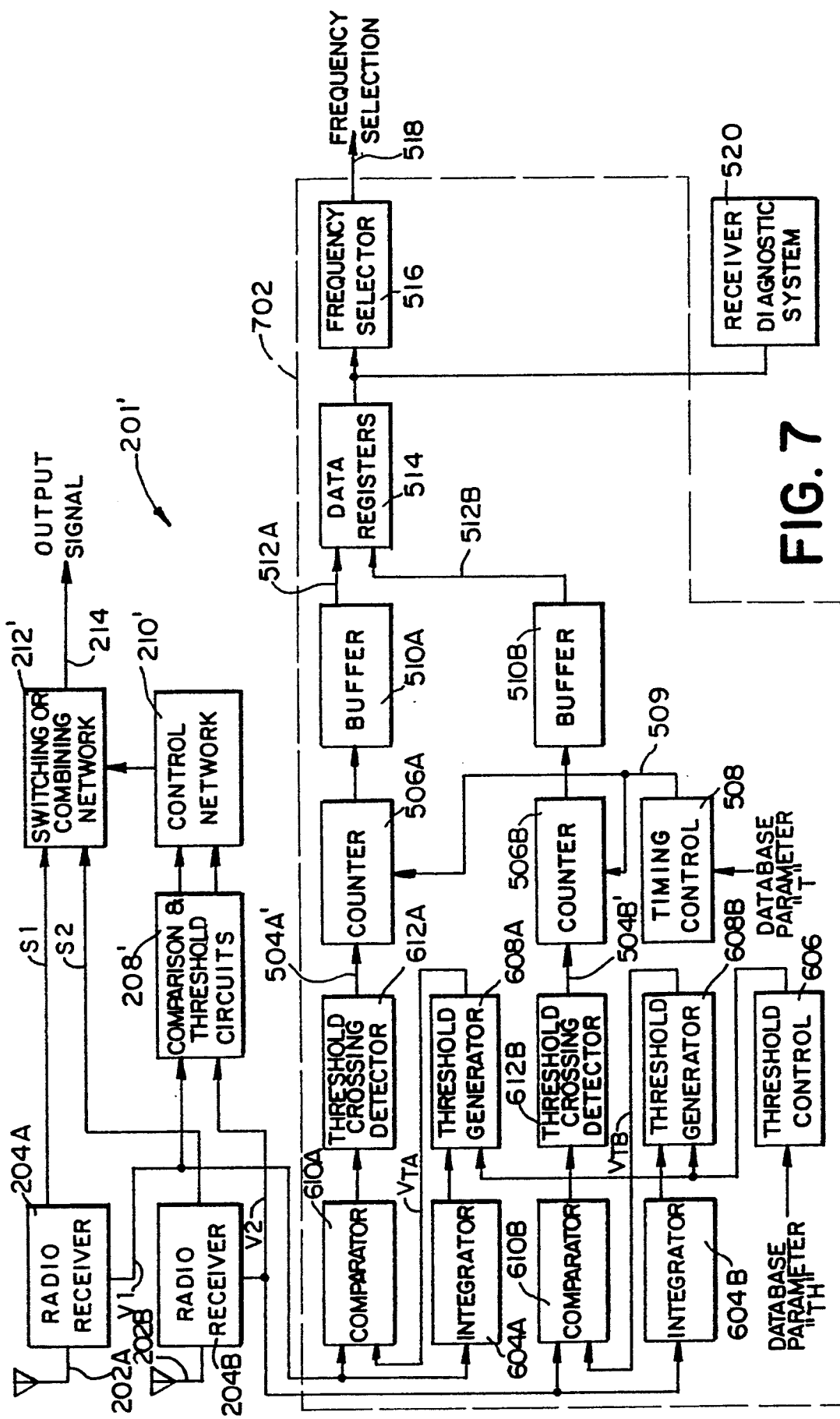
FIG. 7 is a block diagram of a macrocell/microcell frequency assignment system according to a third embodiment of the present invention.

FIG. 6 is a block diagram of a second embodiment of the present invention. FIG. 7 illustrates a block diagram of a third embodiment of the present invention. The second and third embodiments of the present invention are intended to operate with both selection and combining diversity reception radio systems, whether they accurately detect fading or not. The structure and operation of the second and third embodiments of the present invention are described in detail below.

Referring to FIG. 6, there is shown a block diagram of a diversity reception radio system 201'. The diversity reception radio system 201' generally represents either a selection diversity reception radio system or a combining diversity reception radio system. The antennas 202A and 202B receive radio waves transmitted by a mobile communication terminal. The receivers 204A and 204B generate baseband signals S1 and S2 from the received radio signals. The receivers 204A and 204B also generate detected strength signals V1 and V2 from the received radio signals. The detected strength signals V1 and V2 represent the instantaneous signal strengths of the baseband signals S1 and S2 respectively. The diversity reception radio system 201' also includes comparison and threshold circuits 208', a control network 210', and a switching or combining network 212'.

In the case of a selection diversity reception radio system, the comparison and threshold circuits 208', the control network 210', and the switching or combining network 212', operate in a manner similar to the signal comparator 208, switch control 210, and switch 212 respectively, shown in FIG. 5. In the case of a combining diversity reception radio system, the comparison and threshold circuits 208', the control network 210', and the switching or combining network 212' operate to efficiently combine the baseband signals S1 and S2.

As shown in FIG. 6, the diversity reception radio system 201' is connected to a macrocell/microcell frequency selection system 602. The macrocell/microcell frequency selection system 602 includes a comparing means such as a comparator 610 in combination with a threshold crossing detector 612, integrating means such as an integrator 604, threshold generating means such as a threshold generator 608, and a threshold control 606. These components, which are preferably implemented in hardware, generally operate to detect fades in the radio signals transmitted by the mobile communication terminal and received by a single receiver 204A.

The above-described components perform such fade detection by generating a threshold signal and comparing the threshold signal to the detected receiver strength signal V1. Crossings of the threshold signal by the detected strength signal V1 are considered to represent fades in the detected strength signal V1 (and, correspondingly, fades in the radio signals received at the receiver 204A). These components shall now be described in detail.

The integrator 604 receives the detected strength signal V1 and averages the detected strength signal V1 over time to produce a smoothed signal. The threshold generator 608 receives the smoothed signal generated by the integrator 604 and a threshold offset signal which is generated by the threshold control 606. The threshold control 606 derives the threshold offset signal from a user-supplied parameter "TH" which represents the amplitude of the threshold offset signal. The database parameter TH is determined for each particular communication system based upon geography, local terrain conditions, vehicular traffic distributions, etc. as well as system experience and may be adjusted by a system operator to optimize the performance of the macrocell/microcell frequency selection system 602 for the average signal conditions being encountered by the diversity reception radio system 201'. The threshold generator 608 adds the smoothed signal (received from the integrator 604) to the threshold offset signal (received from the threshold control 606) to produce an adjusted threshold signal $V_{T4}$.

As shown in FIG. 6, the comparator 610 receives and compares the detected receiver strength signal V1 and the adjusted threshold signal $V_{T4}$. The comparator 610, in combination with the threshold crossing detector 612, determines when the detected strength signal V1 crosses the adjusted threshold signal $V_{T4}$. When such crossings occur, the threshold crossing detector 612 generates a selection signal 504' which is received by a counter 506.

The selection signal 504' (shown in FIG. 6) is similar to the selection signals 504A and 504B (shown in FIG. 5) since the selection signal 504' essentially represents a fade indicator. That is, the selection signal 504' is generated when a fade in the detected strength signal V1 (and thus a fade in the radio signals received at the receiver 204A) is detected.

As shown in FIG. 6, the macrocell/microcell frequency selection system 602 also includes a counter 506, timing control 508, buffer 510, data registers 514, and frequency selector 516. The structure and operation of each of these elements is essentially the same at the corresponding above described elements having the same reference numbers shown in FIG. 5.

Specifically, the counter 506 increments a count wherever it receives the selection signal 504'. The counter 506 continues to count until it receives a timing signal 509 from the timing control 508. The timing control 508 generates the timing signal 509 upon the expiration of a predetermined time period. Upon receiving the timing signal 509 from the timing control 508, the counter 506 transfers the count to the buffer 510. The count stored in the buffer 510 is called a fade count 512 since it represents the number of fades in the detected receiver strength signal V1 counted during the predetermined time period as measured by the timing control 508. The fade count 512 is transferred to and stored in the data registers 514. The fade count 512 stored in the data registers 514 is accessed by the frequency selector 516. The frequency selector 516 determines whether to assign a macrocell communication frequency or a microcell communication frequency to the mobile communication terminal for the next predetermined time period. The manner in which the frequency selector 516 makes this determination is described in detail above.

As shown in FIG. 6, the macrocell/microcell frequency selection system 602 operates by using the detected strength signal V1 generated by a single receiver 204A. Alternatively, the frequency selection system 602 could operate by using the detected strength signal V2 generated by the other receiver 204B.

This embodiment of the invention, which utilizes the detected signal strength of a single receiver, is also used to determine macrocell/microcell frequency selection in mobile communication systems that do not employ diversity reception (i.e. that only use a single receiver).

Since the macrocell/microcell frequency selection system 602 operates by either using the detected strength signal V1 or the detected strength signal V2, the macrocell/microcell frequency selection system 602 of the second embodiment of the present invention is potentially vulnerable to failures in the receiver subsystems. For example, the macrocell/microcell frequency selection system 602 will not operate properly if it is operating by using the detected strength signal V1 and the receiver 204A fails. Additionally, since the macrocell/microcell frequency selection system 602 counts the fades associated with only one of the receivers 204A or 204B, the macrocell/microcell frequency selection system 602 does not support the use of a receiver diagnostic system 520 as described above with reference to FIG. 5.

The third embodiment of the present invention overcomes the limitations of the second embodiment of the present invention. Referring now to FIG. 7, the third embodiment of the present invention includes a diversity reception radio system 201'. The diversity reception radio systems 201' shown in FIGS. 6 and 7 are essentially the same in structure and operation and will not be described again.

The diversity reception radio system 201' is connected to a macrocell/microcell frequency selection system 702. The macrocell/microcell frequency selection system 702 includes an integrator 604A, threshold generator 608A, comparator 610A, and threshold crossing detector 612A which operate with the detected receiver strength signal V1 generated by receiver 204A. Also, the macrocell/microcell frequency selection system 702 includes a second integrating means such as integrator 604B, second threshold generating means such as threshold generator 608B, second comparing means such as comparator 610B, and threshold crossing detector 612B which operate with the detected receiver strength signal V2 generated by receiver 204B. Generally, the macrocell/microcell frequency selection system 702 includes a set of these four components for each receiver in the diversity reception radio system 201'. The macrocell/microcell frequency selection system 702 also includes a threshold control 606.

The structure and operation of each of the components shown in FIG. 7 is essentially the same as the corresponding components having the same reference numbers shown in FIG. 6. Thus, according to the third embodiment of the present invention, the macrocell/microcell frequency selection system 702 separately detects fades in the radio signals received at each of the receivers 204A and 204B. Such fades are indicated by selection signals 504A' and 504B' which are output from the threshold crossing detectors 612A and 612B, the selection signals 504A' and 504B' representing means for incrementing the counters 506A and 506B.

The macrocell/microcell frequency selection system 702 also includes counters 506A and 506B, timing control 508, buffers 510A and 510B, data registers 514, and a frequency selector 516. The structure and operation of each such component is essentially the same as the corresponding components having the same reference numbers shown in FIG. 6.

Specifically, the counters 506A and 506B increment counts contained therein whenever the selection signals 504A' and 504B', respectively, are received. The counters 506A and 506B continue to count until they receive a timing signal 509 from the timing control 508. The timing control 508 generates the timing signal 509 upon the expiration of a predetermined time period. Upon receiving the timing signal 509, the counters 506A and 506B transfer their respective counts to the buffers 510A and 510B. Since the counts represent the number of fades counted in the detected receiver strength signals V1 and V2 over the predetermined time period, the counts stored in the buffers 510 are called fade counts 512A and 512B.

The fade counts 512A and 512B are transferred to and stored in the data registers 514. The frequency selector 516 accesses the fade counts from the data registers 514 in order to determine whether to assign a macrocell or microcell communication frequency to the mobile communication terminal for the next predetermined time period. The manner in which the frequency selector 516 makes the determination is described in detail above. A receiver diagnostic system 520 also accesses the fade counts from the data registers 514 in order to diagnose the receiver subsystems in the manner described above.

The above description of the present invention generally applies to embodiments wherein the present invention is contained in a base station (which also contains the diversity reception radio system 201, 201'). The present invention may also be contained in a mobile communication terminal (not shown), wherein the user-supplied parameters "TH" and "T" are transferred from the base station to the mobile communication terminal using well-known information exchange protocols. The present invention contained within the mobile communication terminal calculates the fade counts and determines whether to assign a macrocell or microcell communication frequency to the mobile communication terminal for the next predetermined time interval. The mobile communication terminal transfers the fade counts and/or frequency selection to the base station.

Applications of the present invention as described above includes use on analog cellular systems that employ the AMPS, TACS, NAMPS or other narrow band FM radio technology, since the channel bandwidth used (10 KHz to 30 KHz) in these systems exhibit the multipath fades which are utilized by the present invention. For digital cellular and PCS systems, use of TDMA technology or CDMA technology which allow multiple users to share the same channel bandwidth may require a different embodiment than those described herein, although the principles described herein remain unchanged. In the Digital Cellular Standard adopted for the United States, 30 KHz analog channels are used to set up all cellular calls, so the present invention can be used during call initiation. The Digital Cellular Standard also requires the use of 30 KHz analog channel transmitted continuously by base stations which can be used by user terminals equipped with the present invention to estimate the user speed, with the speed estimates being passed to the telecommunications system over the radio channel in use at the time. In other proposed technologies, such as wideband CDMA, various narrow band pilot carriers are used for call supervision and system operational purposes. The present invention can be applied against these adjunct signals to estimate the speed of the user in such wideband systems.

While preferred embodiments of the frequency selection system of the present invention have been described and certain modifications thereto suggested, one of ordinary skill in the art will appreciate that other changes can be made without departing from the broad inventive concepts thereof. It should be understood, therefore, that the invention is not limited to the particular embodiments disclosed, but is intended to cover any modifications which are within the scope and spirit of the invention as defined by the appended claims.

What is claimed is:

1. In a communication system comprising a macrocell area including multiple microcell areas, said macrocell area having one or more unique macrocell communication frequencies and said microcell areas sharing a plurality of microcell communication frequencies, a method for determining whether to assign one of said macrocell or said microcell communication frequencies to a particular mobile communication terminal for a particular communication interval of a communication session, said method comprising the steps of:
- (a) estimating a speed of said mobile communication terminal immediately prior to said communication interval by
  - (1) receiving, at two or more antenna subsystems, radio signals transmitted by said mobile communication terminal;
  - (2) identifying which of said received radio signals has a greatest signal strength;
  - (3) if a selection network is not already switched to the particular one of said antenna subsystems which received said identified radio signal, then switching said selection network from another of said antenna subsystems to said antenna subsystem which received said identified radio signal;
  - (4) incrementing a count when said selection network switches from one of said antenna subsystems to another of said antenna subsystems;
  - (5) repeating steps (1)–(4) for a predetermined time interval; and
  - (6) estimating, after expiration of said predetermined time interval, said mobile communication terminal speed based on said count;
- (b) determining that one of said macrocell communication frequencies should be assigned to said mobile communication terminal if said estimated speed is within a first predetermined range; and
- (c) determining that one of said microcell communication frequencies should be assigned to said mobile communication terminal if said estimated speed is within a second predetermined range.

2. The method of claim 1, wherein step (4) comprises the step of incrementing a count associated with said antenna subsystem which received said identified radio signal when the selection network switches to said antenna subsystem which received said identified radio signal.

3. The method of claim 1, wherein step (4) comprises the steps of:
- maintaining a group of at least two counts, each of the counts associated with a different one of the antenna subsystems;
- incrementing respective ones of the counts when the selection network switches to respective ones of the associated antenna subsystems;
- and wherein step (6) comprises the steps of:
- selecting, after said predetermined time interval, one of the counts from the group; and
- estimating said mobile communication terminal speed based on said selected count.

4. The method of claim 3, further comprising the step of identifying a potentially faulty antenna subsystem by analyzing the counts in the group, comprising the steps of:
- determining whether any of the counts in the group is less than an expected minimum value; and
- identifying as potentially faulty a particular one of the antenna subsystems associated with a particular one of the counts which is determined to be less than the expected minimum value.

5. In a communication system comprising a macrocell area including multiple microcell areas, said macrocell area having one or more unique macrocell communication frequencies and said microcell areas sharing a plurality of microcell communication frequencies, a subsystem for determining whether to assign one of said macrocell or said microcell communication frequencies to a particular mobile communication terminal for a particular communication interval of a communication session, said subsystem comprising:
- (1) at least two antenna subsystems for receiving radio signals transmitted by said mobile communication terminal;
- (2) comparing means for identifying which of said received radio signals has the greatest signal strength;
- (3) a selection network for switching between said receivers, said selection network switching to the particular one of said antenna subsystems which received said identified radio signal if said selection network is not already switched to said particular one of the antenna subsystems which received said identified radio signal;
- (4) means for incrementing a count when said selection network switches from one of said antenna subsystems to another of said antenna subsystems;
- (5) means for estimating the speed of said mobile communication terminal based on the total of said count accumulated within a predetermined time period; and
- (6) means for determining that one of said macrocell communication frequencies should be assigned to said mobile communication terminal if said estimated speed is within a first predetermined range and for determining that one of said microcell communication frequencies should be assigned to said mobile communication terminal if said estimated speed is within a second predetermined range.

6. The subsystem of claim 5, wherein said incrementing means comprises means for incrementing a count associated with said particular one antenna subsystem which received said identified radio signal when the selection network switches to said antenna subsystem which received said identified radio signal.

7. The subsystem of claim 5, wherein said incrementing means comprises:
- a group of at least two counts, each of the counts associated with a different one of the antenna subsystems;
- means for incrementing respective ones of the counts when the selection network switches to respective ones of the associated antenna subsystems;
- and wherein said estimating means comprises:
- means for selecting, after said predetermined time interval, one of the counts from the group; and
- means for estimating said mobile communication terminal speed based on said selected count.

8. The subsystem of claim 7, further comprising means for identifying a potentially faulty antenna subsystem by analyzing the counts in the group, comprising:
- means for determining whether any of the counts in the group is less than an expected minimum value; and
- means for identifying as potentially faulty a particular one of the antenna subsystems associated with a particular one of the counts which is determined to be less than the expected minimum value.

9. In a communication system comprising a macrocell area including multiple microcell areas, said macrocell area having one or more unique macrocell communication frequencies and said microcell areas sharing a plurality of microcell communication frequencies, a method for determining whether to assign one of said macrocell or said microcell communication frequencies to a particular mobile communication terminal for a particular communication interval of a communication session, said method comprising the steps of:
- (a) estimating a speed of said mobile communication terminal immediately prior to said communication interval by
  - (1) receiving, at an antenna subsystem, radio signals transmitted by said mobile communication terminal;
  - (2) detecting said received radio signals to produce a detected signal;
  - (3) averaging said detected signal over time to produce a smoothed signal;
  - (4) adding said smoothed signal to a threshold offset signal to produce an adjusted threshold signal;
  - (5) determining when said detected signal crosses said adjusted threshold signal;
  - (6) incrementing a count whenever said detected signal crosses said adjusted threshold signal;
  - (7) receiving, at a second antenna subsystem, said radio signals transmitted by said communication terminal;
  - (8) detecting said radio signals received by said second antenna subsystem to produce a second detected signal;
  - (9) averaging said second detected signal over time to produce a second smoothed signal;
  - (10) adding said second smoothed signal to said threshold offset signal to produce a second adjusted threshold signal;
  - (11) determining when said second detected signal crosses said second adjusted threshold signal;
  - (12) incrementing a second count whenever said second detected signal crosses said second adjusted threshold signal;
  - (13) repeating steps (1)–(12) for a predetermined time interval;
  - (14) selecting, after said predetermined time interval, a count from a group comprising at least said first count and said second count; and
  - (15) estimating said mobile communication terminal speed based on said selected count;
- (b) determining that one of said macrocell communication frequencies should be assigned to said mobile communication terminal if said estimated speed is within a first predetermined range; and
- (c) determining that one of said microcell communication frequencies should be assigned to said mobile communication terminal if said estimated speed is within a second predetermined range.

10. In a communication system comprising a macrocell area including multiple microcell areas, said macrocell area having one or more unique macrocell communication frequencies and said microcell areas sharing a plurality of microcell communication frequencies, a subsystem for determining whether to assign one of said macrocell or said microcell communication frequencies to a particular mobile communication terminal for a particular communication interval of a communication session, said subsystem comprising:
- (1) an antenna subsystem for receiving radio signals transmitted by said mobile communication terminal and for detecting said received radio signals to produce a detected signal;
- (2) integrating means for averaging said detected signal over time to produce a smoothed signal;
- (3) threshold generating means for adding said smoothed signal to a threshold offset signal to produce an adjusted threshold signal;
- (4) comparing means for determining when said detected signal crosses said adjusted threshold signal and for incrementing a count whenever said detected signal crosses said adjusted threshold signal;
- (5) a second antenna subsystem for receiving said radio signals transmitted by said mobile communication terminal and for detecting said radio signals received by said second antenna subsystem to produce a second detected signal;
- (6) second integrating means for averaging said second detected signal over time to produce a second smoothed signal;
- (7) second threshold generating means for adding said second smoothed signal to said threshold offset signal to produce a second adjusted threshold signal;
- (8) second comparing means for determining when said second detected signal crosses said second adjusted threshold signal;
- (9) second incrementing means for incrementing a second count whenever said second detected signal crosses said second adjusted threshold signal;
- (10) means for estimating a speed of said mobile communication terminal based on one of the total of said count and the total of said second count accumulated within a predetermined time period; and
- (11) means for determining that one of said macrocell communication frequencies should be assigned to said mobile communication terminal if said estimated speed is within a first predetermined range and for determining that one of said microcell communication frequencies should be assigned to said mobile communication terminal if said estimated speed is within a second predetermined range.

11. The subsystem of claim 10, wherein said estimating means comprises:
- means for selecting a count from a group comprising at least said first count and said second count upon expiration of a predetermined time period; and
- means for estimating said mobile communication terminal speed based on said selected count.

* * * * *